United States Patent [19]

Oliver et al.

[11] Patent Number: 4,690,665
[45] Date of Patent: Sep. 1, 1987

[54] CHAIN BELT CONSTRUCTION, LOAD BLOCK THEREFOR AND METHODS FOR MAKING THE SAME

[75] Inventors: Larry R. Oliver, Springfield; James D. Hill, Jr., Marionville; Charles M. Lewis, Springfield; Gerald C. Hollaway, Jr., Springfield; Jack Nelson, Springfield, all of Mo.

[73] Assignee: Dayco Products, Inc., Dayton, Ohio

[21] Appl. No.: 795,070

[22] Filed: Nov. 5, 1985

[51] Int. Cl.⁴ .............................................. F16G 5/18
[52] U.S. Cl. .................................................... 474/245
[58] Field of Search ........................ 474/245, 242, 201

[56] References Cited

U.S. PATENT DOCUMENTS

| | | | |
|---|---|---|---|
| 1,407,598 | 2/1922 | Smith et al. | 474/245 |
| 4,313,730 | 2/1982 | Cole, Jr. et al. | 474/201 |
| 4,392,843 | 7/1983 | Smit | 474/245 |
| 4,464,152 | 8/1984 | Kern | 474/245 |
| 4,486,185 | 12/1984 | Cataldo | 474/201 |
| 4,512,754 | 4/1985 | Cole, Jr. et al. | 474/245 |
| 4,516,963 | 5/1985 | Mott | 474/245 |
| 4,516,964 | 5/1985 | Laster | 474/245 |
| 4,516,965 | 5/1985 | Mott | 474/245 |
| 4,595,387 | 6/1986 | Frazier et al. | 474/242 |

FOREIGN PATENT DOCUMENTS

| | | | |
|---|---|---|---|
| 395074 | 5/1924 | Fed. Rep. of Germany | 474/245 |
| 1085383 | 7/1970 | Fed. Rep. of Germany | 474/245 |

Primary Examiner—Stephen J. Novosad
Assistant Examiner—William P. Neuder
Attorney, Agent, or Firm—Joseph V. Tassone

[57] ABSTRACT

A chain belt construction, a load block therefor and methods of making the same are provided, the chain belt construction comprising a plurality of interleaved sets of links, each set of links having a transversely disposed pivot pin arrangement joining its links to the links of the sets of links adjacent thereto, and a plurality of load blocks respectively interconnected to certain of the sets of links to be carried thereby, each load block having a tubular opening arrangement therein telescopically receiving the pivot pin arrangement of its respective set of links therein to interconnect that load block to its respective set of links.

18 Claims, 7 Drawing Figures

CHAIN BELT CONSTRUCTION, LOAD BLOCK THEREFOR AND METHODS FOR MAKING THE SAME

BACKGROUND OF THE INVENTION

1. Field of the Invention

This invention relates to a new chain belt construction and to a new load block means therefor as well as to new methods of making the same.

2. Prior Art Statement

It is known to provide a chain belt construction comprising a plurality of interleaved sets of links, each set of links having transversely disposed pivot pin means joining its links to the links of the sets of links adjacent thereto, and a plurality of load block means respectively interconnected to certain of the sets of links to be carried thereby. For example, see the Cole, Jr. et al, U.S. Pat. No. 4,313,730; the Smit, U.S. Pat. No. 4,392,843; the Kern, U.S. Pat. No. 4,464,152; the Cataldo, U.S. Pat. No. 4,486,185; the Cole, Jr. et al, U.S. Pat. No. 4,512,754; the Mott, U.S. Pat. No. 4,518,963; the Laster, U.S. Pat. No. 4,516,964 and the Mott, U.S. Pat. No. 4,516,965.

SUMMARY OF THE INVENTION

It is one feature of this invention to provide a new chain belt construction wherein unique means are provided for securing the load block means to their respective sets of links.

In particular, it was found according to the teachings of this invention that the pivot pin means being utilized to interconnect each set of links of a chain belt construction to the sets of links adjacent thereto, so that the sets of links are disposed in an interleaved manner, can be utilized to interconnect the load block means to their respective sets of links.

For example, one embodiment of this invention provides a chain belt construction comprising a plurality of interleaved sets of links, each set of links having transversely disposed pivot pin means joining its links to the links of the sets of links adjacent thereto, and a plurality of load block means respectively interconnected to certain of the sets of links to be carried thereby, each load block means having means defining tubular opening means therein that telescopically receive the pivot pin means of its respective set of links therein to interconnect that load block means to its respective set of links each means that defines its respective opening means having a portion thereof that interlocks with its respective pivot pin means to prevent rotational movement therebetween.

Accordingly, it is an object of this invention to provide a new chain belt construction having one or more of the novel features of this invention as set forth above or hereinafter shown or described.

Another object of this invention is to provide a new method of making a chain belt construction, the method of this invention having one or more of the novel features of this invention as set forth above or hereinafter shown or described.

Another object of this invention is to provide a new load block means for a chain belt construction, the load block means of this invention having one or more of the novel features of this invention as set forth above or hereinafter shown or described.

Another object of this invention is to provide a new method of making a load block means for a chain belt construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
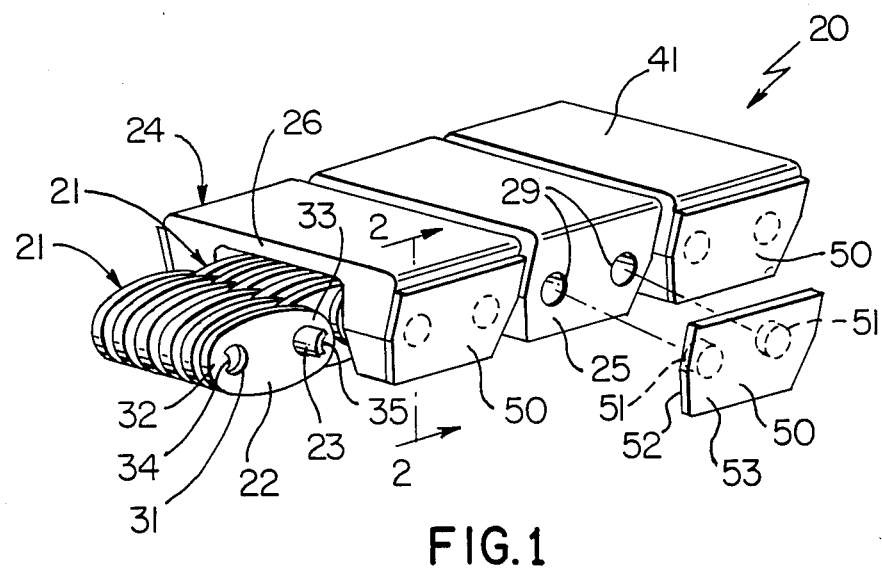
FIG. 1 is a perspective view of a portion of the chain belt construction of this invention.

While the various features of this invention are hereinafter illustrated and described as being particularly adapted to provide a chain belt construction particularly adapted to be utilized for a continuously variable transmission arrangement, it is to be understood that the various features of this invention can be utilized singly or in various combinations thereof to provide a chain belt construction for other uses as desired.

Therefore, this invention is not to be limited to only the embodiments illustrated in the drawings, because the drawings are merely utilized to illustrate one of the wide variety of uses of this invention.

Referring now to FIG. 1, the new chain belt construction of this invention is generally indicated by the reference numeral 20 and comprises a plurality of interleaved sets 21 of links 22 with each set 21 having two transversely disposed pivot pin means 23 joining its links 22 to the links 22 of the two sets 21 of links 22 adjacent thereto, the chain belt construction 20 further comprising a plurality of load block means 24 respectively interconnected to certain sets 21 of links 22 to be carried thereby. Each load block means 24 has opposed angled side faces 25 for respectively engaging the inwardly facing side faces (not shown) of the sheaves (not shown) of a continuously variable transmission pully arrangement (not shown) to transmit a driving force from the drive pulley to the driven pulley in a manner well known in the art, such as in the manner fully disclosed in the aforementioned eight U.S. patents whereby these eight U.S. Pat. Nos. 4,313,730; 4,392,843; 4,464,152; 4,486,185; 4,512,754; 4,516,963; 4,516,964 and 4,516,965 are being incorporated into this disclosure by this reference thereto.

Therefore, since the use and operation of a chain belt construction is well known in the art, a further discussion of the general structure and operation thereof need not be set forth whereby the following description of the chain belt construction 20 of this invention will be directed to the unique features thereof.

In particular, it has been previously stated that it is one feature of this invention to utilize the pivot pin means 23 of the sets 21 of links 22 to interconnect the load block means 24 to certain of the sets 21 of links 22 in a unique manner and, therefore, the unique details of the load block means 24 of this invention for accomplishing such purpose will now be described.

Figure 2:
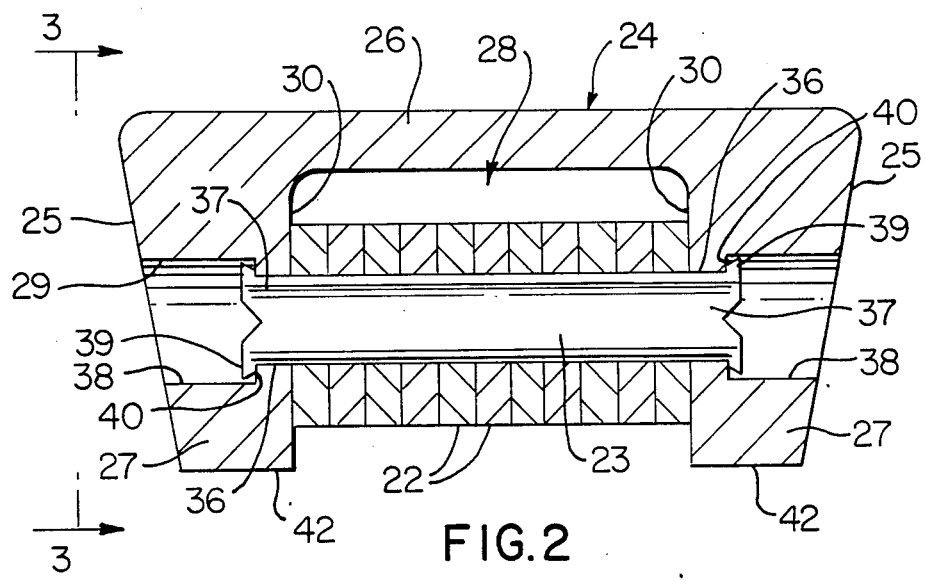
FIG. 2 is an enlarged cross-sectional view taken on line 2—2 of FIG. 1.

As illustrated in FIG. 2, each load block means or link cap 24 is substantially U-shaped as defined by a cross portion 26 and a pair of legs 27 defining a bight or slot 28 therebetween which is adapted to receive its particular set 21 of links 22 therein with the U-shaped load block means 24 being disposed in an inverted manner so that the cross member 26 extends across the top of the chain belt construction 20 as illustrated in the drawings.

While each load block means 24 is illustrated as being a one-piece structure, it is to be understood that each load block means 24 can comprise a plurality of parts as desired.

Each leg 27 of each load block means 24 is interrupted by a pair of transversely disposed opening means 29 that extend from the exterior of the angled side face 25 thereof through the inside surface 30 of the respective leg 27 to be in axial alignment with the like opening means 29 formed in the other leg 27 of the respective load block means 24, the opening means 29 of each load block means 24 being formed in any suitable manner and also being adapted to be disposed in axial alignment with the two pivot pin means 23 of the respective set 21 of links 22 that pass through openings 31 in the opposed ends 32 and 33 of the links 22 in a conventional manner to pivotally interconnect those particular links 22 to the interleaved ends 33, 32 of the adjacent sets 21 of links 22 in a conventional manner. While the cross-sectional configuration of the pivot pin means 23 and openings 31 in the links 22 can be any conventional arrangement of cross-sectional configurations, the embodiment thereof illustrated in the drawings is such that each opening 31 is substantially circular except for an inwardly directed convex surface means 34 that is adapted to mate with a longitudinally disposed concave recess 35 in the respective pivot pin means 23 in a manner well known in the art.

Each opening means 29 in each load block means 24 is stepped and defines a reduced portion 36 that has a cross-sectional configuration that is adapted to closely mate with the particular cross-sectional configuration of the respective pivot pin means 23 that is adapted to have one of the opposed ends 37 thereof telescopically disposed through the reduced portion 36 and extend slightly into an enlarged substantially cylindrical portion 38 of the respective opening means 29.

In this manner, each load block means 24 is adapted to be disposed over its respective set 21 of links 22 and have the pivot pin means 23 thereof inserted through the opening means 29 in one of the legs 27 thereof and through the cooperating openings 31 not only of the set 21 of links 22 that will carry that particular load block means 24 but also through the openings 31 of the interleaved links 22 of the sets 21 of links 22 that are adjacent thereto and then into the aligned opening means 29 of the other leg thereof so that the opposed ends 37 of each pivot pin means 23 will have portions 39 thereof extending into their respective enlarged portions 38 of the opening means 29 so as to be swaged or staked against the shoulder means 40 of the legs 27 that are defined between the portions 36 and 38 of the opening means 29 to not only fasten that load block means 24 to its respective pivot pin means 22, but also to hold the pivot pin means 23 in their assembled relation with the cooperating links 22 as illustrated in the drawings. However, it is to be understood that the ends 37 of the pivot pin means 23 can be secured to its respective load block means 24 in any other desired manner.

Nevertheless, it can be seen that by utilizing the pivot pin means 23 to secure the load block means 24 to their respective sets 21 of links 22, the pivot pin means 23 are being uniquely utilized for the dual purpose of not only interconnecting the interleaved sets 21 of links 22 in a manner conventional in the art, but also to interconnect the load block means 24 to their respective sets 21 of links 22 by having their opposed ends 37 respectively telescopically disposed in the tubular opening means 29 of their respective load block means 24. And by having each pivot pin means 23 provided with a cross-sectional configuration that is noncircular and mating with a like configuration for the respective portions 36 of the opening means 29 of the respective load block means 24, each load block means 24 is rotationally interlocked to its respective set 21 of links 22 to move only in unison therewith and not relative thereto.

Figure 3:
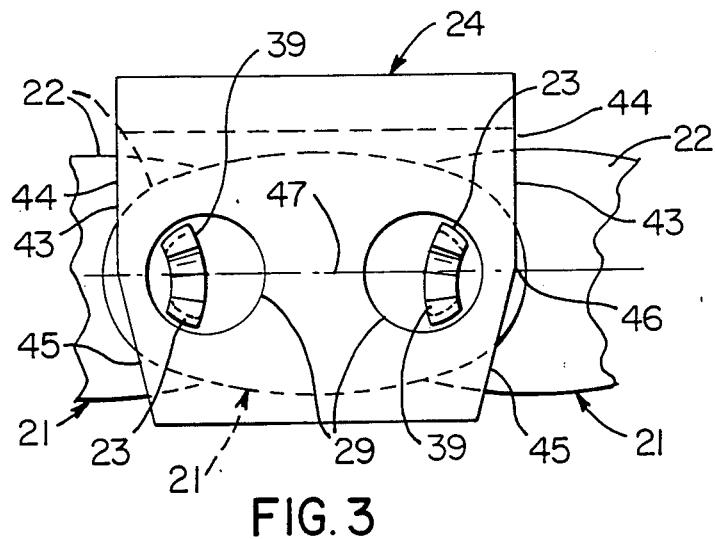
FIG. 3 is an end view of the chain belt construction illustrated in FIG. 2 and is taken in the direction of the arrows 3—3 thereof.
Figure 4:
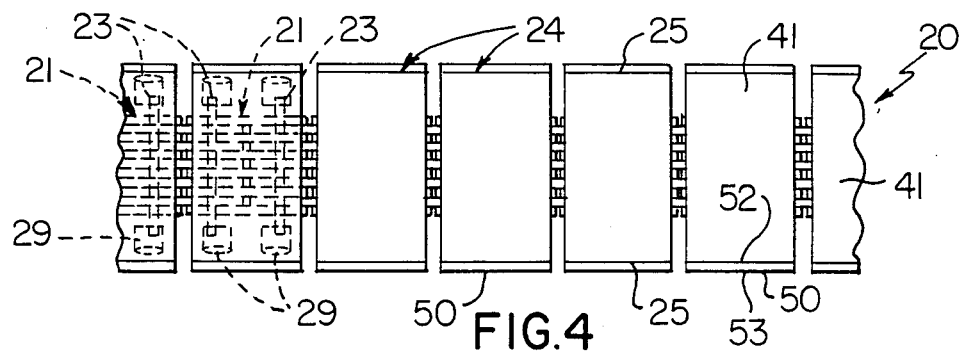
FIG. 4 is a reduced top view of a portion of the chain belt construction of FIG. 1.

Each load block means 24 can have any suitable configuration and in the embodiment illustrated in the drawings, each load block means 24 has a substantially rectangular flat top surface 41 with the legs 27 respectively having substantially flat rectangular bottom surfaces 42. The front and rear faces 43 (depending upon the driving direction of the endless belt construction 20) of each load block means 24 have substantially flat upper portions 44 that are disposed substantially parallel to each other and substantially flat rectangular lower portions 45 on the legs 27 thereof that are angled relative to each other and converge toward each other as the same approach the bottom surfaces 42, each angled surface 45 joining with its respective surface portion 44 along a transverse line 46 that is disposed substantially perpendicular to a line 47 in FIG. 3 that passes through the center points not only of the enlarged portions 38 of the opening means 29 of that load block means 24, but also through the longitudinal axis of the respective pivot pins 23 when the same are disposed in the opening means 29 as previously described.

Figure 5:
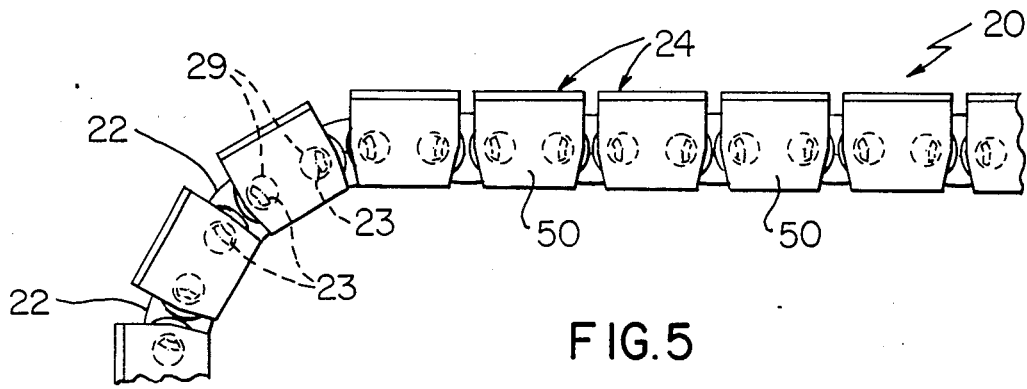
FIG. 5 is a reduced side view of a portion of the chain belt construction of FIG. 1.
Figure 6:
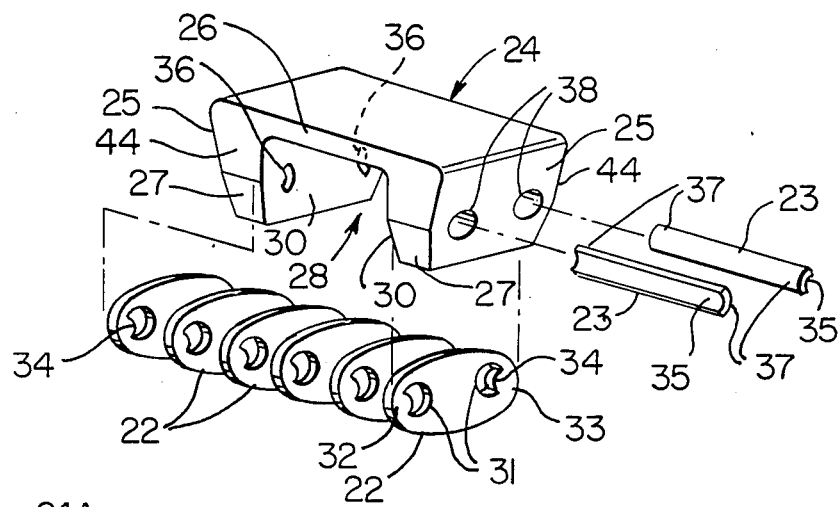
FIG. 6 is an exploded perspective view of one of the set of links and its associated load block means of the belt construction of FIGS. 1-3.

In this manner, the front and rear faces 43 of the load block means 24 readily permit the chain belt construction 20, when formed in an endless looped manner, to move around a pulley arrangement that has a relatively short radius as illustrated in FIG. 5 and in a manner well known in the art.

While the load block means 24 of this invention has been previously illustrated and described as being substantially U-shaped, it is to be understood that the same could be substantially box-shaped so as to provide a cross member across the lower portion of the legs thereof as is well known in the art.

Figure 7:
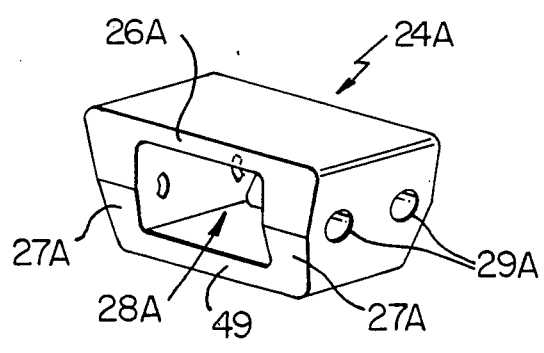
FIG. 7 is a perspective view of another embodiment of a load block means of this invention.

For example, reference is now made to FIG. 7 wherein another load block means of this invention is generally indicated by the reference numeral 24A and parts thereof similar to the load block means 24 previously described are indicated by like reference numerals followed by the reference letter "A".

As illustrated in FIG. 7, the load block means 24A is substantially box-shaped and has an opening means 28A passing completely therethrough to receive a set 21 of links 22 in the manner previously described and be interconnected thereto by pivot pin means 23 being received in the tubular opening means 29A thereof in the manner previously described, the load block means 24A being substantially the same as the load block means 24 except that the same has a lower cross member 49 joining the legs 27A together opposite to the cross member 26A thereof.

While the load block means 24 and 24A of this invention, as well as the links 22 and pivot pin means 23 have all been illustrated as being formed of metallic material and of being of certain sizes relative to each other, it is to be understood that the same could be formed of different sizes and/or of other materials or combination of materials as desired.

For example, it has been found that certain problems are caused by chain belt constructions being formed of metal-on-metal, namely, (A) minimal friction of metal-on-metal exposed to lubricant such as where the metal side surfaces 25 of the load block means 24 contact metal side faces on the sheaves of the pulleys utilizing the belt constructions 20, (B) noise, (C) heavy weight and (D) intermittent lubricant starvation between contacting metal parts.

Solutions to (A) above are to increase the friction levels by: (a) modifying the traction surfaces 25 of the chain belt construction 20 with friction altering inorganic or organic materials including metals, ceramics, polymers and/or combinations thereof by means such as chemical, metallurgical or sintered bonding, total or partial encapsulation as well as through openings and in cavities, mechanical fastening, and/or combinations thereof; (b) coating the traction surfaces 25 of the chain belt constructions 20 with metals, ceramics or polymers by methods such as: (i) thermal spraying (by plasma, wire arc, flame, etc.), (ii) welding, (iii) chemical or physical vapor deposition, (iv) ion implantation, (v) electrical or electroless chemical plating, etc.; (c) texturing of the traction surfaces 25 of the load block means by methods such as: (i) machining, (ii) shot peening; (iii) grin, bead blasting or chemical etching, etc; and (d) applying methods (A)-(a), (b), (c) above also to the mating pulley surfaces either in combination with or independently of such above modifications to chain belt construction 20.

One such means for providing friction increasing means on the surfaces 25 of the load block means 24 is illustrated in FIG. 1 wherein a flat plate-like member 50 is formed of any suitable friction material and has a pair of projections 51 extending from the side 52 thereof to be respectively received in the opening means 29 in the side face 25 of its respective load block means 24 so that the outside surface 53 of the member 50 will provide the traction surface therefor, the projections 51 being secured in the opening means 29 in any suitable manner, such as by press fitting, adhesive means, etc. Thus, a member 50 can be provided for each surface 25 of the load block means 24 of the chain belt construction 20.

Solutions to (B) above are to reduce the noise of the chain belt construction 20 by: (a) inserting polymers between contacting metal components of the chain belt construction 20 by means such as: (i) alternating links 22 made of metal and a polymer with a polymeric link adjacent to the outer metal load block means or cap plate 24; (ii) coating the metal links 22, load block means 24 and pivot pins 23 with polymers; (iii) manufacturing any or all components from polymers including integration of polymeric links 22 or spacers and polymeric or polymeric-encapsulated load block means 24 into one part; (b) altering the metal traction surfaces 25 of the chain belt construction 20 by bonding, fastening, coating or texturing as in (A)-(a), (b), and (c) previously described in order to dampen or change objectionable noise amplitudes or frequencies produced by impacting metal components of the belt construction 20 or produced by the traction surfaces 25 contacting mating pulley surfaces; and (c) altering the mating pulley surfaces as set forth in (B)-(b) above either independently or in combination with such changed chain belt construction 20.

Solutions to (C) above are to reduce the weight of the chain belt construction 20 by: (a) utilizing lighweight metal, such as aluminum or magnesium links 22 and/or load block means 24 with surfaces, especially the traction surfaces 25, coated as in (A)-(a), (b) and (c) previously described to prevent wear of the lightweight metal; (b) replacing metal components especially, links 22 and load block means 24, with high strength and abrasive resistant polymers, which may or may not be coated as in (A)-(a), (b) and (c) previously described; (c) replacing metal components, especially the load block means 24, with strong lightweight ceramics; (c) reducing the metal component dimensions by utilizing higher strength metals for the heaviest parts and compensating for the reduced dimensions with lighter weight and lower strength materials, such as polymers, lighter weight metals or ceramics, etc., and (e) applying to the mating pulley surfaces the methods of (C)-(a), (b) and (c) set forth above either in combination with or independently of changes to the chain belt construction 20.

Solutions to (D) above are to minimize temporary lubricant starvation between contacting metal components by: (a) utilizing polymeric components as in (B)-(a) previously set forth in place of or interspaced between the metal components. Also, compounded polymers can incorporate self-lubricating materials therein to provide dry lubricity to minimize abrasion. Such additives are typified by graphite or carbon powder or fibers, silicone, molydendeum disulfide, brass powder or flakes, aluminum powder or flakes, fluoropolymers or aramid fibers or powders; (b) utilizing a surface coating or texturing method on the chain belt construction surfaces as in (A)-(a), (b) and (c) as previously described which temporarily entraps and retains lubricant within the traction surfaces 25 while engaging the mating pulley surfaces; and (c) utilizing methods (D)-(b) as previously described on the mating pulley surfaces in combination with or independently of such changes to the chain belt construction.

Thus, it can be seen that many changes can be made to the chain belt construction 20 of this invention, if desired, to overcome some of the problems previously set forth.

In any event, it can be seen that this invention not only provides a new chain belt construction and method of making the same, but also this invention provides a new load block means and method of making the same.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention is the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a chain belt construction comprising a plurality of interleaved sets of links, each set of links having transversely disposed pivot pin means joining its links to the links of the sets of links adjacent thereto, and a plurality of load block means respectively interconnected to certain of said sets of links to be carried thereby, the improvement wherein each said load block means has means defining tubular opening means therein that telescopically receive said pivot pin means of its respective set of links therein to interconnect that load block means to its respective set of links, each said means that defines its respective opening means having a portion thereof that interlocks with its respective pivot pin means to prevent rotational movement therebetween.

2. A chain belt construction as set forth in claim 1 wherein each said pivot pin means has opposed ends, each said opening means receiving one of said opposed ends of one of said pivot pin means therein.

3. A chain belt construction as set forth in claim 2 wherein each said end of each said pivot pin means is staked to its respective load block means.

4. A chain belt construction as set forth in claim 2 wherein each said opening means leads to the exterior of its respective load block means.

5. A chain belt construction as set forth in claim 2 wherein each said pivot pin means has a non-circular transverse cross-sectional configuration and wherein each said portion defines a transverse cross-sectional configuration of its respective opening means that substantially mates with said non-circular transverse cross-sectional configuration of its respective pivot pin means.

6. A chain belt construction as set forth in claim 2 wherein each said load block means has a pair of said opening means disposed in spaced apart aligned relation and respectively receiving said opposed ends of one of said pivot pin means therein.

7. A chain belt construction as set forth in claim 2 wherein each said load block means has two pairs of said opening means with each pair being disposed in spaced apart aligned relation and respectively receiving said opposed ends of one of said pivot pin means therein.

8. A chain belt construction as set forth in claim 7 wherein each set of links has two pivot pin means and wherein said certain of said sets of links comprises every other set of links in the chain thereof.

9. A chain belt construction as set forth in claim 8 wherein each said load block means is substantially U-shaped and receives its respective set of links in the bight thereof.

10. A chain belt construction as set forth in claim 8 wherein each said load block means is substantially box shaped with a central opening passing therethrough and receiving its respective set of links therein.

11. In a load block means for a chain belt construction comprising a plurality of interleaved sets of links with each set of links having transversely disposed pivot pin means joining its links to the links of the sets of links adjacent thereto, said load block means being adapted to be interconnected to one of said sets of links to be carried thereby, the improvement wherein said load block means has means defining tubular opening means therein so as to be adapted to telescopically receive said pivot pin means of its respective set of links therein to interconnect said load block means to its respective set of links, each said means that defines its respective opening means having a portion thereof that is adapted to interlock with its respective pivot pin means to prevent rotational movement therebetween.

12. A load block means as set forth in claim 11 wherein each said opening means is adapted to receive one of the opposed ends of one of said pivot pin means therein.

13. A load block means as set forth in claim 12 wherein each said opening means leads to the exterior of said load block means.

14. A load block means as set forth in claim 12 wherein each said pivot pin means has a non-circular transverse cross-sectional configuration and wherein each said portion defines a transverse cross-sectional configuration of its respective opening means that is adapted to substantially mate with said non-circular transverse cross-sectional configuration of its respective pivot pin means.

15. A load block means as set forth in claim 12 wherein said load block means has a pair of said opening means disposed in spaced apart aligned relation for respectively receiving the opposed ends of one of said pivot pin means therein.

16. A load block means as set forth in claim 12 wherein said load block means has two pairs of said opening means with each pair being disposed in spaced apart aligned relation for respectively receiving the opposed ends of one of said pivot pin means therein.

17. A load block means as set forth in claim 16 wherein said load block means is substantially U-shaped for receiving its respective set of links in the bight thereof.

18. A load block means as set forth in claim 16 wherein said load block means is substantially box shaped with a central opening passing therethrough for receiving its respective set of links therein.

* * * * *